United States Patent Office 3,132,953
Patented May 12, 1964

3,132,953
FUSED CAST REFRACTORY AND METHOD
OF MAKING
Allen M. Alper, Horseheads, Edward R. Begley, Corning, Joseph W. Londeree, Painted Post, and Robert N. Mc-Nally, Corning, N.Y., assignors, by mesne assignments, to Cohart Refractories Company, a corporation of Delaware
No Drawing. Filed July 26, 1961, Ser. No. 126,896
10 Claims. (Cl. 106—57)

This invention relates to improvements in fused cast zirconia-alumina-silica refractory compositions consisting essentially of zirconia and corundum crystals in a siliceous glass matrix, articles made thereof, and the method of making them.

Fused cast zirconia-corundum-glass refractory material, as disclosed in United States Patent 2,271,366 to T. E. Field, is made by melting suitable raw materials, e.g. zircon and alumina, at a temperature of about 1750°–1900° C., casting the molten batch into preformed molds and annealing the cast product (as, for example, with the techniques disclosed in United States Patents 1,615,750 and 1,700,288 to G. S. Fulcher).

This polyphase material is known for its resistance to corrosion and erosion by molten glass and it is commonly used for glass tank blocks. The cast blocks exhibit a dense, non-porous structure (except for a vug portion or shrinkage cavity in the center of the block) in which a siliceous glass matrix thoroughly fills the interstices between the crystals. The latter consist of a random mixture of zirconia crystals that tend to form a chain-like arrangement and lath-like corundum crystals. These crystals have substantially well-developed crystal faces, i.e., they are euhedral and subhedral as contrasted to anhedral or skeletal crystals. Additionally, some small zirconia crystals appear within the corundum grains.

The production of cast blocks of this material has been subjected to manufacturing problems that result in low recovery of merchantable product. In commercial production, this recovery has run as low as 45% of the total blocks cast and generally averages no better than 75–80% recovery.

These manufacturing problems are essentially of two types. The first type involves cracks in the central portions of the cast product that occur during cooling in the mold, despite careful control of insulating powder. As a result, the casting is penetrated by molten glass along these cracks and thereby suffers greater corrosion and erosion. The second type involves loss of corners (and sometimes edges) of cast blocks resulting in an unmerchantable product. This is observed upon removal of the casting from the mold or it readily occurs during handling and shipping. It is referred to as corner spalling because of the conchoidal shape of the fracture, although in the ceramic industry, spalling is normally applied to fractures resulting from strains developed during heating of a body in use.

In earlier work of others, the first mentioned problem of cracking has been substantially overcome by the controlled addition of minor ingredients which enter and form part of the glass phase. In United States Patent 2,438,552 to T. E. Field, small quantities of alkali oxides, alkaline earth oxides, $TiO_2$, and $Fe_2O_3$ are utilized for this purpose. The combination of small amounts of boric oxide and alkali oxide for preventing cracking is disclosed in United States Patents 2,903,373 to K. H. Sandmeyer and 2,919,994 to F. C. Steimke, Jr. The latter also discloses alkaline earth oxide in place of alkali oxide in the combination for the same result.

However, none of the improvements made to eliminate the first type of manufacturing problem have solved the second type of problem involving corner spalling prior to use in a refractory lining of a glass tank.

It is an object of this invention to provide greatly increase recovery of merchantable fused cast zirconia-corundum-glass refractory product.

It is a further object of this invention to provide a fused cast zirconia-corundum-glass refractory capable of resisting corner spalling prior to use in a refractory lining.

Other objects and advantages will be apparent from the following disclosure.

It has been discovered that the foregoing objects can be attained in a fused cast refractory consisting essentially of zirconia, alumina, and silica, in which the zirconia is about 15% to 60% and the silica is not greater than about 20%, by incorporating 0.05% to 1.5% of a halogen and 0.5% to 2.5% alkali oxide (e.g., $Na_2O$ or $K_2O$) in the fused molten refractory and thereafter cooling the molten refractory in a mold to form a solid cast shape.

The fused cast refractory of the invention broadly consists essentially of crystalline zirconia and corundum in a siliceous glass matrix and contains a total of silica not greater than about 20%, 0.05% to 1.5% of a halogen, and 0.5% to 2.5% alkali oxide.

Preferably, the silica should be in the range of 1% to 20% and the zirconia should be in the range of 15% to 60%.

In a more preferred form, the refractory of the invention consists essentially of crystalline zirconia and corundum in a siliceous glass matrix and contains 30% to 40% $ZrO_2$, 10% to 20% $SiO_2$, 0.15% to 0.4% fluorine, 1% to 2% $Na_2O$, and the balance essentially $Al_2O_3$.

Impurities normally resulting from available raw materials and other minor ingredients for known purposes do not affect the novel results produced by the combination of a halogen and alkali oxide; however, the total of such impurities and minor additions should not exceed about 3% and more preferably should be not over 1%. For example, the refractory of the invention may optionally contain up to about 0.5% each of $Fe_2O_3$ and $TiO_2$, up to about 0.8% MgO, and up to about 1.5% each of CaO and $B_2O_3$.

Throughout this specification and the claims, the composition is expressed in terms of weight percent based on oxide and halogen analysis.

The halogen can be provided by any one of a number of halides, which may be mixed with other batch ingredients prior to melting. Generally, the metal halide would preferably be one of those having a boiling point above about 1000° C. because halides with too low a boiling point will almost completely vaporize off from the batch charge during the melting operation before they can fuse with the other ingredients. Thus, it has been determined, as a practical matter, that those metal halides with boiling points not substantially lower than 1000° C. will fuse into the molten pool formed during melting. Due to the low partial pressure of halogen in the bath as a result of the lower concentration of halogen when fused in the refractory bath and to the fact that equilibrium between the partial pressure of halogen in the bath and above the bath is not attained in the relatively short fusion time before casting, a very substantial amount, if not all, of the halogen will be retained in the bath at the time of casting.

Examples of suitable metal halides and their boiling points are as follows:

| Halide: | B.P., °C. | Halide: | B.P., °C. |
|---|---|---|---|
| $CaF_2$ | 2,500 | $MgCl_2$ | 1,412 |
| $AlF_3$ | 1,260 | $NaCl$ | 1,413 |
| $MgF_2$ | 2,239 | $KCl$ | 1,500 |
| $BaF_2$ | 2,137 | $NaI$ | 1,300 |
| $SrF_2$ | 2,460 | $KI$ | 1,330 |
| $NaF$ | 1,705 | $NaBr$ | 1,390 |
| $CaCl_2$ | >1,600 | $KBr$ | 1,380 |

Mixtures or complex metal halides with sufficiently high boiling points can also be used, e.g., cryolite.

In practicing the present invention, suitable raw materials are proportioned in accordance with the desired final composition, preferably all being premixed prior to charging into the melting furnace, and then are processed according to the well known fusion casting techniques, for example, as disclosed in the aforementioned prior patents.

Preferred raw materials for providing the oxidic constituents in the refractory of the invention are: zircon (essentially 67% $ZrO_2$ and 33% $SiO_2$), high purity Bayer process alumina (99.5+%) and soda ash (58.3+% $Na_2O$ and remainder volatile matter).

Exemplary raw materials for providing the preferred halogen, fluorine, are: fluorspar (97.3+% $CaF_2$) and $AlF_3$ (99+%).

The amount of fluorine retained in the cast product from the original batch addition of the above fluorspar and $AlF_3$ consistently amounts to not less than about 55%. Hence, the particular halogen-providing material must be proportioned in the batch accordingly.

A series of example batched compositions, with corresponding cast product analyses appearing below each batched composition, are tabulated in Table I.

*Table I*

| Run No. | $ZrO_2$ | $SiO_2$ | $Na_2O$ | $B_2O_3$ | $CaF_2$ | $AlF_3$ | Total fluorine | $Al_2O_3$* |
|---|---|---|---|---|---|---|---|---|
| 4755 | 33.75 | 15.3 | 1.50 | 0.24 | 0.41 | 0.06 | 0.24 | Balance. |
|  | 34.2 | 15.2 | 1.51 | 0.39 |  |  | 0.135 | Do. |
| 4761 | 33.75 | 15.3 | 1.50 | 0.24 | 0.41 | 0.06 | 0.24 | Do. |
|  | 33.8 | 15.2 | 1.50 | 0.40 |  |  | 0.21 | Do. |
| 4760 | 33.75 | 15.3 | 1.50 | 0.06 | 0.21 | 0.44 | 0.40 | Do. |
|  | 33.8 | 15.5 | 1.48 | 0.11 |  |  | 0.341 | Do. |
| 4757 | 33.75 | 15.3 | 1.60 | 0.06 | 0.21 | 0.21 | 0.24 | Do. |
|  | 34.7 | 15.1 | 1.57 | 0.24 |  |  | 0.14 | Do. |

* Includes residual impurities and minor ingredients, if any, totalling less than 1%.

An illustration of the consistent improvement in recovery of merchantable cast product, as a result of the reduction of corner spalling occurring prior to use in a glass tank, is shown in Table II for a series of batches melted in normal production quantities and cast into 300–1200 pound commercial castings. The analyses of the predominant oxide constituents shown are averages of individual cup samples of the liquid being cast, taken at periodic intervals during a run. The fluoride additions and $B_2O_3$ content are shown as percentages of the total batch because not all of the runs were subjected to the expense of analyzing for fluorine and $B_2O_3$ in view of the established trend of recovery for these constituents as shown in Table I. In each run, the balance of the composition is $Al_2O_3$ with residual impurities and minor ingredients, if any, totalling less than 2%.

*Table II*

| Run No. | Casting analyses | | | Batched composition | | | Castings | |
|---|---|---|---|---|---|---|---|---|
|  | $ZrO_2$ | $SiO_2$ | $Na_2O$ | $B_2O_3$ | $CaF_2$ | $AlF_3$ | Made | Spalled, percent |
| 4592 | 32.6 | 15.9 | 1.42 | 0.21 | 0 | 0 | 43 | 30.2 |
| 4642 | 32.2 | 15.9 | 1.41 | 0.22 | 0.5 | 0 | 301 | 4.6 |
| 4596 | 33.4 | 15.5 | 1.39 | 0.21 | 0 | 0 | 105 | 53.4 |
| 4633 | 33.1 | 15.5 | 1.35 | 0.23 | 0.5 | 0 | 207 | 5.8 |
| 4592 | 32.6 | 15.9 | 1.42 | 0.21 | 0 | 0 | 43 | 30.2 |
| 4634 | 32.5 | 16.3 | 1.39 | 0.21 | 0 | .35 | 35 | 5.7 |
| 4486 | 33.6 | 14.9 | 1.27 | 0.17 | 0 | 0 | 115 | 29.6 |
| 4531 | 33.1 | 15.1 | 1.38 | 0.21 | 0 | .35 | 32 | 12.5 |
| 4591 | 33.4 | 15.7 | 1.51 | 0.21 | 0 | 0 | 136 | 13.2 |
| 4572 | 33.5 | 15.7 | 1.48 | 0.23 | 0 | .5 | 21 | 0.0 |
| 4568 | 33.3 | 15.4 | 1.52 | 0.23 | 0 | 0 | 147 | 19.7 |
| 4761 | 33.8 | 15.2 | 1.50 | 0.24 | .41 | .06 | 40 | 7.5 |
| 4755 4761 | 34.0 | 15.2 | 1.51 | 0.24 | .41 | .06 | 81 | 5.7 |
| 4486 | 33.6 | 14.9 | 1.27 | 0.17 | 0 | 0 | 115 | 29.6 |
| 4710 | 33.1 | 14.4 | 1.31 | 0.25 | .37 | .09 | 138 | 14.5 |
| 4596 | 33.4 | 15.5 | 1.39 | 0.21 | 0 | 0 | 105 | 53.4 |
| 4666 | 33.2 | 15.5 | 1.38 | 0.23 | .33 | .10 | 375 | 3.7 |
| 4681 | 33.8 | 15.6 | 1.36 | 0.23 | .33 | .10 | 178 | 3.9 |
| 4701 | 33.9 | 15.6 | 1.37 | 0.23 | .23 | .19 | 110 | 10.9 |
| 4696 | 33.2 | 15.6 | 1.30 | 0.23 | .21 | .19 | 303 | 10.6 |
| 4566 | 33.2 | 15.6 | 1.57 | 0.23 | 0 | 0 | 220 | 16.8 |
| 4756 | 34.1 | 15.6 | 1.55 | 0.25 | .21 | .21 | 13 | 0.0 |
| 4592 | 32.6 | 15.9 | 1.42 | 0.25 | 0 | 0 | 43 | 30.2 |
| 4699 | 32.8 | 15.9 | 1.30 | 0.23 | .21 | .19 | 277 | 8.3 |
| 4630 | 33.3 | 15.9 | 1.30 | 0.25 | .49 | .38 | 37 | 2.7 |
| 4592 | 32.6 | 15.9 | 1.42 | 0.25 | 0 | 0 | 43 | 30.2 |
| 4645 | 33.6 | 16.0 | 1.41 | 0.07 | 0.5 | 0 | 51 | 7.8 |
| 4654 | 33.5 | 16.0 | 1.37 | 0.22 | 0.55 | 0 | 180 | 7.8 |
| 4650 | 33.4 | 16.2 | 1.42 | 0.24 | 0.5 | 0 | 177 | 4.0 |
| 4621 | 33.2 | 16.2 | 1.39 | 0.21 | 0.5 | 0 | 189 | 6.3 |
| 4566 | 33.2 | 15.6 | 1.57 | 0.23 | 0 | 0 | 220 | 16.8 |
| 4757 | 34.7 | 15.1 | 1.57 | 0.05 | 0.21 | 0.21 | 33 | 3.0 |
| 4729 | 33.8 | 15.4 | 1.53 | 0.25 | 0.31 | 0.16 | 206 | 4.4 |
| 4760 | 33.8 | 15.5 | 1.48 | 0.06 | 0.21 | 0.44 | 33 | 0.0 |
|  |  |  |  |  | $3NaF \cdot AlF_3$ | | | |
| 4596 | 33.4 | 15.5 | 1.39 | 0.21 | 0 | | 105 | 53.4 |
| 4769 | 34.4 | 14.9 | 1.36 | 0.25 | 0.37 | | 29 | 13.8 |

It can be seen that the desired objects are effectively obtained only when the halogen is included together with an alkali oxide within the prescribed critical ranges in a zirconia-corundum-glass refractory composition. The $B_2O_3$ can be reduced to residual impurity levels or be omitted and the halogen-alkali oxide combinations will still yield the desired results.

Below the prescribed minimum limit for the halogen, no significant reduction of corner spalling will occur. Halogen in excess of the prescribed maximum limits materially decreases the corrosion resistance of the refractory to molten glass and causes objectionably increased quantities of glass phase.

The alkali oxide content should not be reduced below the prescribed minimum limits because then mullite crystals will form which reduce the corrosion resistance to molten glass and because detrimental central cracking, as described earlier, will occur, despite the presence of the prescribed quantity of halogen. Alkali oxide in excess of the prescribed maximum limits produces substantially the same adverse effects as does excessive halogen.

Microstructurally, there is no significant observable alteration in the zirconia-corundum-glass refractory with the halogen as compared to the same refractory without the halogen. The halogen appears to be dissolved in the glass phase, but it is not certain in what form it exists. The arrangement and uniform fine size of the zirconia and corundum crystals are the same with and without fluorine. Only a slight increase in the amount of siliceous glass matrix occurs when the halogen is incorporated in the form of an alkali halide or an alkaline earth halide, but no significant increase or decrease in glass phase occurs, for example, when an aluminum halide is used as the source of the halogen.

While it is not fully understood why the halogen in the fused cast zirconia-corundum-glass refractory improves the resistance to corner spalling, a possible explanation is that the siliceous glass phase containing the halogen is less viscous at lower temperatures during cooling. This glass phase then has a greater capability of absorbing detrimental stresses resulting in the areas of severest non-equilibrium cooling conditions, i.e., the corners and edges.

It should be understood that the illustrated embodiments of the invention may be varied in their details within the spirit of the invention. As for example, the raw material providing the fluorine need not be premixed with the other batch materials, but may be added at any stage of the fusing or pouring operations and may even be placed in the mold prior to pouring. Accordingly, it is intended that the scope of the present invention be limited only by the appended claims.

What is claimed is:

1. The process for increasing the resistance to corner spalling of a fused cast zirconia-corundum-glass refractory which comprises incorporating 0.05% to 1.5% of a halogen and 0.5% to 2.5% alkali oxide in a fused molten refractory consisting essentially of zirconia, alumina, and silica, in which the zirconia is about 15% to 60% and the silica is not greater than about 20%, and thereafter cooling the molten refractory in a mold to form a solid shaped article.

2. The process for increasing the resistance to corner spalling of a fused cast zirconia-corundum-glass refractory which comprises incorporating 0.05% to 1.5% of fluorine and 0.5% to 2.5% alkali oxide in a fused molten refractory consisting essentially of zirconia, alumina, and silica, in which the zirconia is about 15% to 60% and the silica is not greater than about 20%, and thereafter cooling the molten refractory in a mold to form a solid shaped article.

3. A fused cast refractory consisting essentially of crystalline zirconia and corundum in a siliceous glass matrix and containing a total of silica not greater than about 20%, 0.05% to 1.5% of a halogen, and 0.5% to 2.5% alkali oxide.

4. The fused cast refractory of claim 3 wherein the said halogen is fluorine.

5. A fused cast refractory consisting essentially of crystalline zirconia and corundum in a siliceous glass matrix and containing 15% to 60% zirconia, 1% to 20% silica, 0.05% to 1.5% of a halogen, and 0.5% to 2.5% alkali oxide.

6. The fused cast refractory of claim 5 wherein the said halogen is fluorine.

7. A fused cast refractory consisting essentially of crystalline zirconia and corundum in a siliceous glass matrix and containing 15% to 60% $ZrO_2$, 1% to 20% $SiO_2$, 0.05% to 1.5% of a halogen, 0.5% to 2.5% alkali oxide, up to about 0.5% each of $Fe_2O_3$ and $TiO_2$, up to about 0.8% MgO, up to about 1.5% each of CaO and $B_2O_3$, and the balance essentially $Al_2O_3$.

8. The fused cast refractory of claim 7 wherein the said halogen is fluorine.

9. A fused cast refractory consisting essentially of crystalline zirconia and corundum in a siliceous glass matrix and containing 30% to 40% $ZrO_2$, 10% to 20% $SiO_2$, 0.15% to 0.4% fluorine, 1% to 2% $Na_2O$, and the balance essentially $Al_2O_3$.

10. The process for increasing the resistance to corner spalling of a fused cast zirconia-corundum-glass refractory which comprises incorporating 0.05% to 1.5% of a halogen and 0.5% to 2.5% alkali oxide in a fused molten refractory consisting essentially of zirconia, alumina and not more than about 20% silica in proportions forming, upon solidification, crystalline zirconia and corundum in a siliceous glass matrix, and thereafter cooling the molten refractory to form a solid shaped article.

References Cited in the file of this patent

UNITED STATES PATENTS

| | | |
|---|---|---|
| 2,271,367 | Fulcher et al. | Jan. 27, 1942 |
| 2,424,082 | Field | July 15, 1947 |
| 2,438,552 | Field | Mar. 30, 1948 |

UNITED STATES PATENT OFFICE
CERTIFICATE OF CORRECTION

Patent No. 3,132,953            May 12, 1964

Allen M. Alper et al.

It is hereby certified that error appears in the above numbered patent requiring correction and that the said Letters Patent should read as corrected below.

In the grant, lines 4 and 13, and in the heading to the printed specification, line 7, for "Cohart Refractories Company", each occurrence, read -- Corhart Refractories Company --; column 2, lines 10 and 11, for "increase" read -- increased --.

Signed and sealed this 6th day of October 1964.

(SEAL)
Attest:

ERNEST W. SWIDER
Attesting Officer

EDWARD J. BRENNER
Commissioner of Patents